United States Patent
Baird et al.

(10) Patent No.: US 12,401,559 B2
(45) Date of Patent: Aug. 26, 2025

(54) IN PEAK-TO-AVERAGE POWER RATIO REDUCTION AND PROCESSING EFFICIENCY FOR HYBRID/DIGITAL SIGNALS

(71) Applicant: iBiquity Digital Corporation, Calabasas, CA (US)

(72) Inventors: Jeffrey S Baird, Calabasas, CA (US); Paul J. Peyla, Calabasas, CA (US)

(73) Assignee: iBiquity Digital Corporation, Columbia, MD (US)

( * ) Notice: Subject to any disclaimer, the term of this patent is extended or adjusted under 35 U.S.C. 154(b) by 0 days.

(21) Appl. No.: 18/285,569

(22) PCT Filed: Apr. 15, 2021

(86) PCT No.: PCT/US2021/027490
§ 371 (c)(1),
(2) Date: Oct. 4, 2023

(87) PCT Pub. No.: WO2022/220833
PCT Pub. Date: Oct. 20, 2022

(65) Prior Publication Data
US 2024/0187299 A1 Jun. 6, 2024

(51) Int. Cl.
*H04L 27/34* (2006.01)
*H04L 27/36* (2006.01)

(52) U.S. Cl.
CPC ........ *H04L 27/3411* (2013.01); *H04L 27/366* (2013.01)

(58) Field of Classification Search
CPC . H04L 27/3411; H04L 27/366; H04L 27/2624
USPC .......................................................... 375/261
See application file for complete search history.

(56) References Cited

FOREIGN PATENT DOCUMENTS

| WO | WO-2012102935 A1 * | 8/2012 | ......... H04L 27/2623 |
|---|---|---|---|
| WO | WO-2017109552 A1 * | 6/2017 | ........... H04B 1/0475 |

OTHER PUBLICATIONS

Novel Iterative Clipping and Error Filtering Methodsfor Efficient PAPR Reduction in 5G and Beyond Selahattin Gökceli 1 (Member, IEEE), Toni Levanen2 (Member, IEEE), Taneli Riihonen 1 (Member, IEEE), Juha Yli-Kaakinen 1, (Year: 2021).*

(Continued)

*Primary Examiner* — Tanmay K Shah
(74) *Attorney, Agent, or Firm* — Lerner David LLP

(57) ABSTRACT

A method comprises performing iterations of a peak-to-average ratio (PAR) reduction algorithm on a modulated OFDM symbol, each of the iterations including: clipping the modulated OFDM symbol to produce a clipped modulated OFDM symbol; subtracting the clipped modulated OFDM symbol from the modulated OFDM symbol to produce a difference signal; weighting the difference signal using a weight that varies across the iterations, to produce a weighted difference signal that varies across the iterations; subtracting the weighted difference signal from the modulated OFDM symbol to produce a modified modulated OFDM symbol; and performing further PAR reduction operations on the modified modulated OFDM symbol to produce a PAR-reduced OFDM symbol for use in a next iteration.

23 Claims, 6 Drawing Sheets

(56) References Cited

OTHER PUBLICATIONS

Gokceli Selahattin et al: "Novel Iterative Clipping and Error Filtering Methods for Efficient PAPR Reduction in 5G and Beyond", IEEE Open Journal of the Communications Society, IEEE, vol. 2, Dec. 9, 2020 (Dec. 9, 2020), pp. 48-66, XP011829541, DOI: 10.1109/0JCOMS.2020.3043598 [retrieved on Jan. 5, 2021].
International Search Report for PCT/US2021/027490 mailed Jan. 4, 2022. 4 pgs.

* cited by examiner

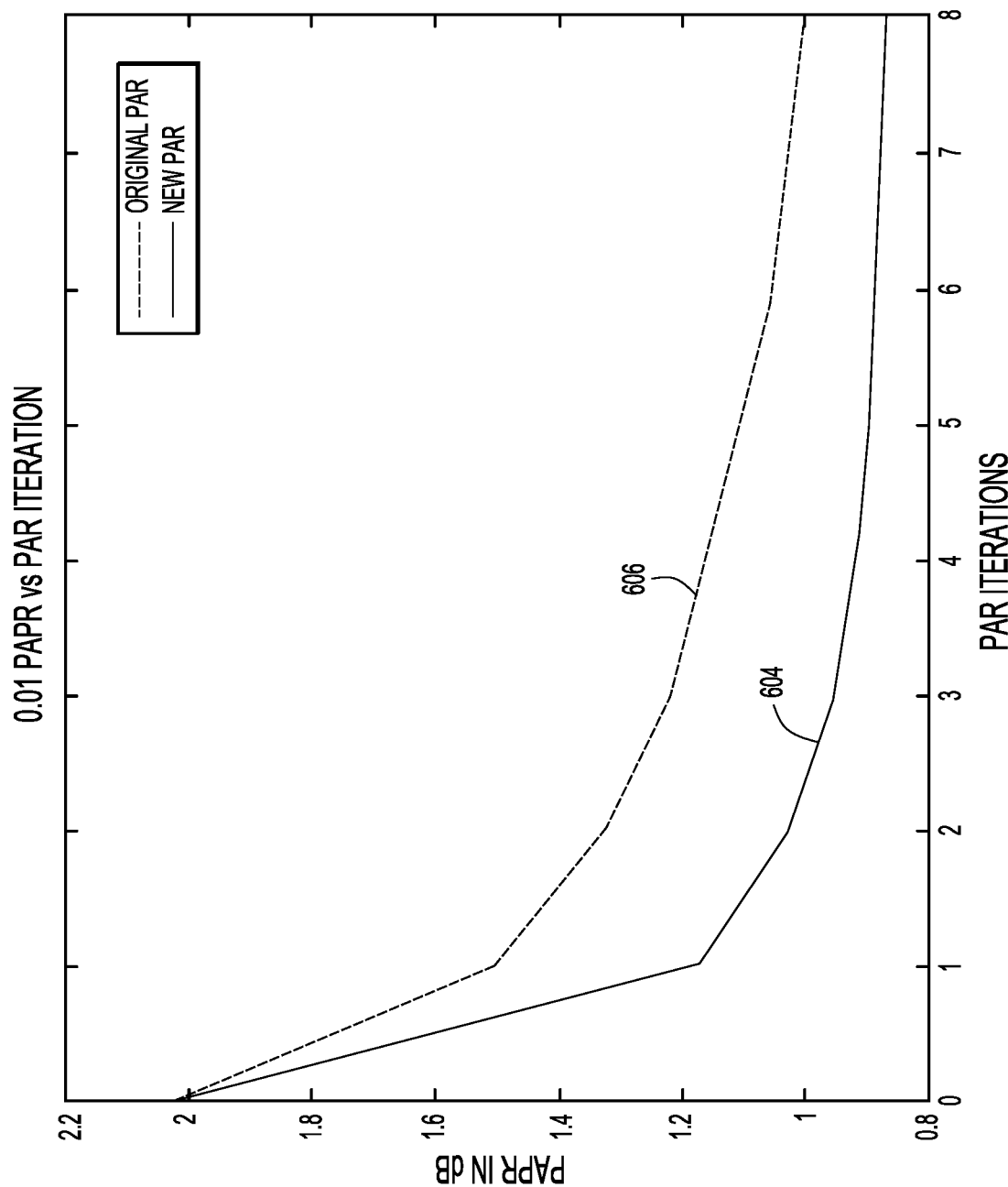

IN PEAK-TO-AVERAGE POWER RATIO REDUCTION AND PROCESSING EFFICIENCY FOR HYBRID/DIGITAL SIGNALS

CROSS-REFERENCE TO RELATED APPLICATIONS

The present application is a national phase entry under 35 U.S.C. § 371 of International Application No. PCT/US2021/027490 filed Apr. 15, 2021, published in the United States, all of which are incorporated herein by reference.

TECHNICAL FIELD

The present disclosure relates to peak-to-average ratio (PAR) reduction methods for digitally modulated and hybrid signals.

BACKGROUND

HD Radio™ digital broadcasting is a medium for providing digital-quality audio, superior to existing analog broadcasting formats. Both amplitude modulation (AM) and frequency modulation (FM) HD Radio signals can be transmitted in a hybrid format where the digitally modulated signal coexists with the currently broadcast analog AM or FM signal, or in an all-digital format without an analog signal. In-band-on-channel (IBOC) HD Radio systems require no new spectral allocations because each HD Radio signal is simultaneously transmitted within the same spectral mask of an existing AM or FM channel allocation. An HD Radio digital broadcasting system is described in U.S. Pat. No. 6,549,544, which is hereby incorporated by reference.

HD Radio broadcasting systems use a set of orthogonal frequency division multiplexed (OFDM) subcarriers to transmit a digital signal. A drawback of OFDM is its relatively high PAR. Conventional PAR reduction techniques may use clipping to attenuate signal peaks in a modulated OFDM signal to acceptable levels prior to transmission; however, the signal peaks may reoccur in subsequent processing.

BRIEF DESCRIPTION OF THE DRAWINGS

FIG. 6 shows example Peak-to-Average Power Ratio (PAPR) performance comparison curves.

DESCRIPTION OF EXAMPLE EMBODIMENTS

Example Embodiments

Embodiments presented herein include improvements to peak-to-average ratio (PAR) reduction techniques for a digitally modulated signal, such as Quadrature Amplitude Modulation (QAM) and Quadrature Phase Shift Keying (QPSK) signals. The PAR reduction techniques are applicable to hybrid and all-digital HD Radio signals, for example. More specifically, the embodiments introduce a PAR clipping improvement into iterations of the PAR reduction techniques.

Figure 1:
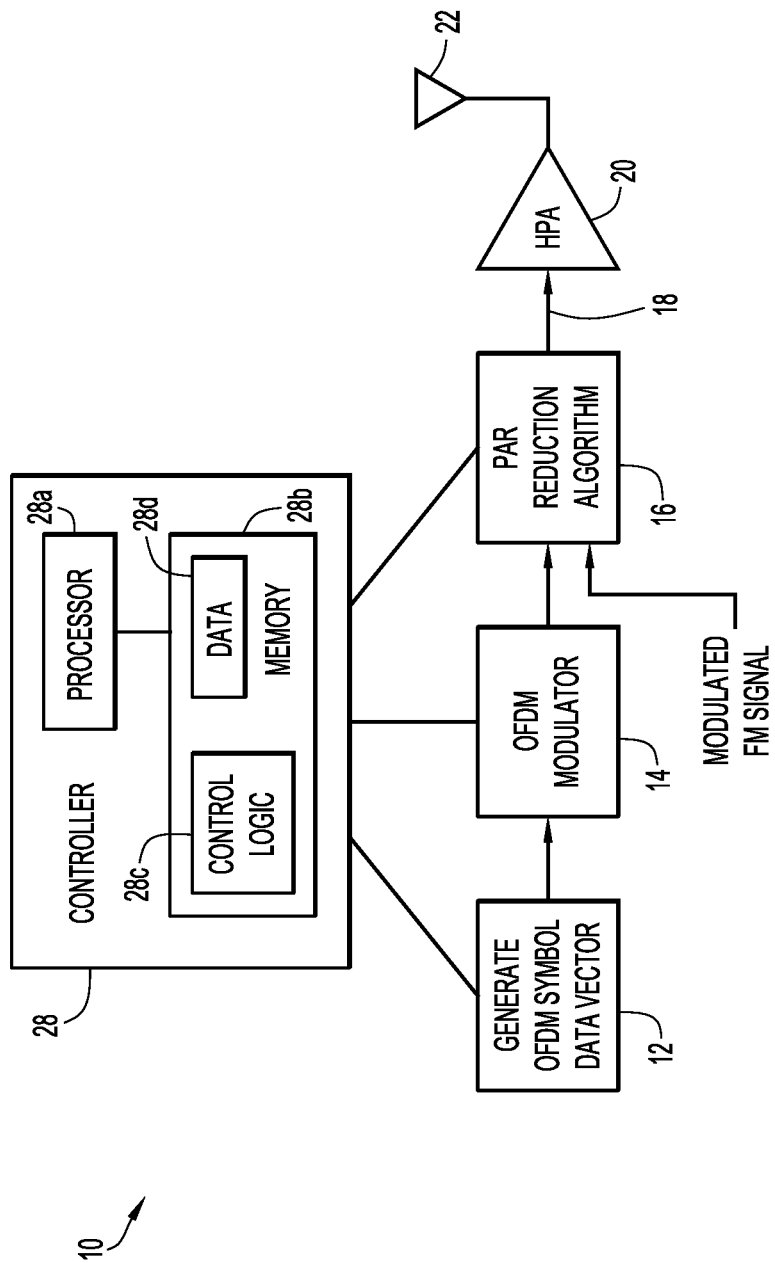
FIG. 1 is a simplified block diagram of an example transmitter with PAR reduction.

FIG. 1 is a simplified functional block diagram of a transmitter system 10 including a PAR reduction algorithm inserted between an OFDM modulator and a high power amplifier (HPA). The transmitter includes a symbol generator 12 that produces OFDM symbol data vectors comprised of groups of QAM coded bits containing the information to be transmitted on a plurality of digitally modulated subcarriers. These symbols are passed to an OFDM modulator 14, which converts the vector data into a time-domain sequence of signal samples of modulated OFDM symbols. OFDM modulator 14 provides the modulated OFDM symbols to an input of a PAR reduction algorithm 16. In a hybrid signal embodiment, PAR reduction algorithm 16 also receives a modulated FM signal concurrently with the modulated OFDM symbols. In another embodiment, the modulated FM signal is absent. In both embodiments, PAR reduction algorithm 16 reduces signal peaks in the modulated OFDM symbols, to produce a PAR reduced output 18. PAR reduced output 18 is amplified by high power amplifier 20 to form a signal to be transmitted with a reduced PAR at antenna 22.

Transmitter system 10 further includes a controller 28 communicatively coupled to blocks 12, 14, and 16. Controller 28 includes a processor 28a and memory 28b. Processor 28a may include a microcontroller or microprocessor, for example, configured to execute software instructions stored in memory 28b. Memory 28b may comprise read only memory (ROM), random access memory (RAM), or other physical/tangible (e.g., non-transitory) memory storage devices. Thus, in general, memory 28b may comprise one or more computer readable storage media (e.g., a memory device) encoded with software comprising computer executable instructions and when the software is executed (by processor 28a) it is operable to perform operations described herein. For example, memory 28b stores or is encoded with instructions for control logic 28c to implement blocks 12, 14, and 16 and to perform overall control of transmitter system 10. Memory 28b also stores information/data 28d described herein that is used and generated by the control logic.

Figure 2:
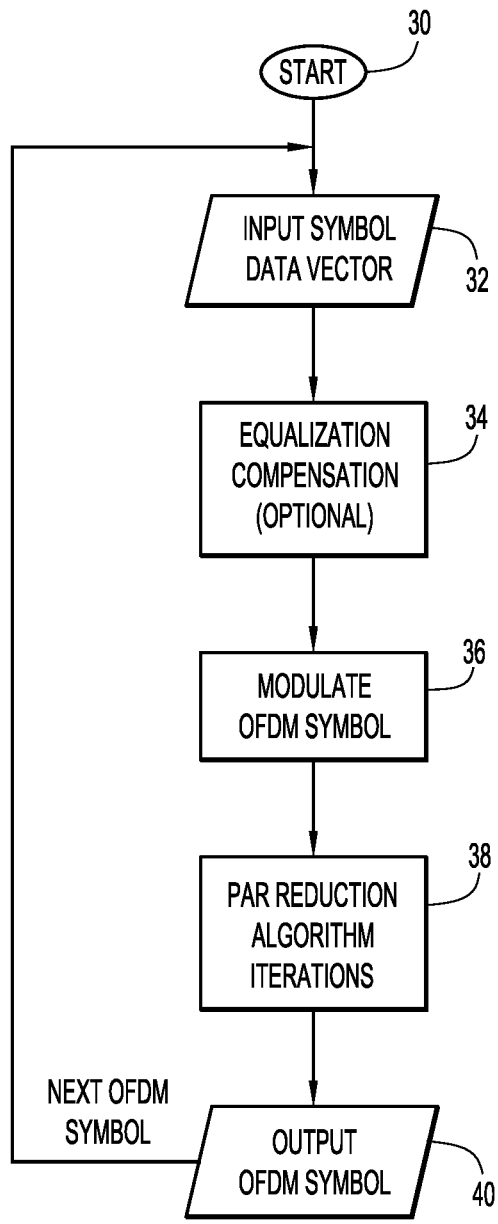
FIG. 2 is a top-level flowchart of an example PAR reduction algorithm.

A top-level flowchart of major PAR reduction algorithm operations for an FM hybrid digital modulation system or an only-digital modulation system is presented in FIG. 2. This flowchart starts at block 30 and shows the operations of inputting an OFDM symbol vector, through outputting modulated and PAR-reduced time-domain signal samples for each OFDM symbol. The input OFDM symbol vector block 32 shows that the input is a data vector comprising the bits for each active QAM subcarrier for the OFDM symbol. This can be viewed as the frequency-domain representation for each Fast Fourier Transform (FFT) bin (subcarrier) prior to OFDM modulation, where the FFT converts a complex time-domain signal block into complex frequency component bins uniformly spaced over the sample-rate bandwidth. Each active bin is represented by a complex number for QAM modulation on that bin (subcarrier). Active bins with intentionally reduced signal levels can be scaled to other binary sets of levels. Inactive bins are initially set to zero.

The equalization compensation block 34 performs optional equalization compensation. When linear distortion (filtering) is a significant factor at an output network (HPA output) of the transmitter, then equalization compensation can be used to precorrect the input to the HPA. The equalization compensation uses a vector (the same size as the input vector) containing the reciprocal of the complex output gain (linear distortion) for each subcarrier. The complex gain associated with each bin is a complex number which, in effect, multiplies (distorts) the original complex frequency sample (bin). Each of the elements of the input vector is multiplied by each of the corresponding elements of the equalization vector to yield an equalized input symbol data vector.

The modulate OFDM symbol block 36 converts the input symbol data vector into a time-domain signal for each OFDM symbol. This transformation is performed via an Inverse Complex Fast Fourier Transform (IFFT), and then a cyclic prefix with a predetermined guard time is appended to the end of the output vector prior to tapering the ends of the symbol with a root-Nyquist pulse shape. This guard time, cyclic prefix extension, and windowing are used to improve the signal's performance in the presence of multipath interference, as well as to suppress the frequency sidelobes of the subcarriers resulting in reduced out-of-band emissions.

The PAR reduction algorithm block 38 represents the iterative algorithms used in reducing the PAR of the modulated OFDM symbol, which may or may not be in the presence of a modulated FM signal. Example processes of block 38 are described below in connection with FIGS. 3-5. Block 38 uses both OFDM modulation and demodulation. The OFDM modulation and demodulation may be unchanged relative to those described above, although the resulting OFDM symbol time-domain samples are somewhat different due to the equalization. The equalization within the PAR reduction algorithm is either removed or restored at several steps in the algorithm such that the digital modulation (e.g., QAM) constraints imposed on the OFDM symbol vectors do not undo the equalization. Examples of the equalization compensation and removal algorithms are described in U.S. Pat. No. 8,798,196, which is hereby incorporated by reference.

The output OFDM symbol block 40 outputs the time-domain samples of the PAR-reduced OFDM signal. Then the process continues for subsequent OFDM symbols.

The PAR reduction algorithm block 38 may be applied to a hybrid signal that includes a modulated OFDM symbol and a modulated FM analog signal. The PAR reduction algorithm block 38 may attenuate signal peaks in the hybrid signal. One method of attenuating signal peaks is to use a clip operation to clip the magnitude of the sum of the OFDM symbol and the FM analog signal to a predetermined level. This allows the signal peaks to be moderated so that the PAR of the time-domain hybrid signal is reduced; however, the signal peaks will reappear when the time-domain hybrid signal is processed for transmission. One way to help overcome the regrowth of such peaks is to overweight the clip value produced by the clip operation so that the regrowth will end up being closer to the originally desired clip level. This works well when there are big magnitude peaks in the signal. However, when the process is performed over many iterations, this technique will start to break down and actually cause an increase in PAR.

To mitigate this adverse effect over several iterations, the embodiments presented herein multiply the clip value by a weight that is varied across iterations. For example, the weight may decreases with each iteration, ending up at unity upon the last iteration. The successive weight decrease with each iteration counteracts the regrowth of magnitude peaks. In addition, when a relatively higher number of iterations are to be used, it is desirable to have a relatively larger initial weight compared to when a relatively lower number of iterations are used. Examples of the foregoing are described below in connection with FIGS. 3-5.

Figure 3:
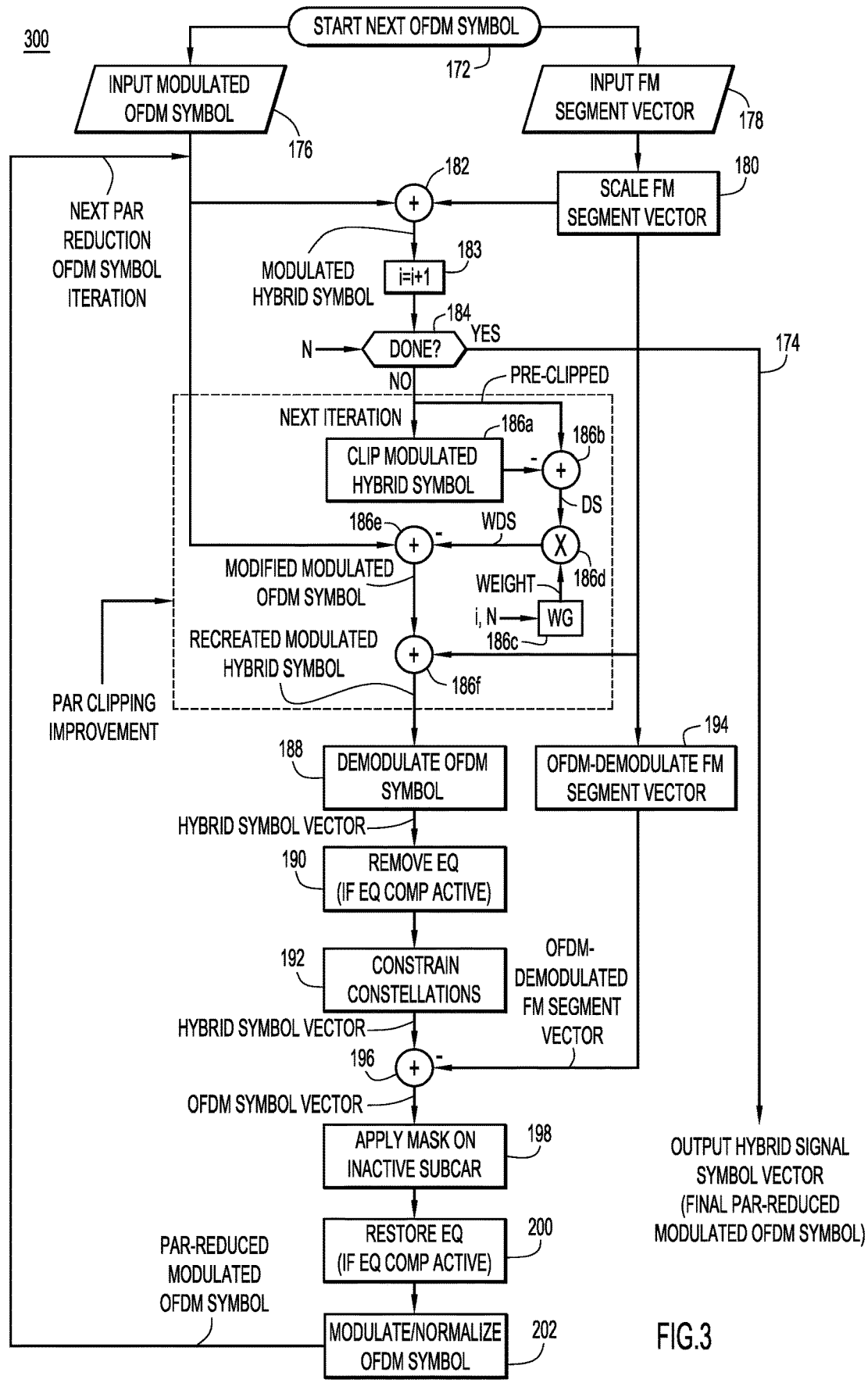
FIG. 3 is a flowchart of a first example PAR reduction algorithm iteration for a modulated hybrid symbol.

FIG. 3 shows example operations for an iterative PAR reduction algorithm 300 (also referred to as "process 300" or simply the "process") applied to a hybrid signal that includes modulated OFDM symbols in the presence of an analog (modulated) FM signal. Process 300 performs a series of iterations on each of the modulated OFDM symbols in the presence of the modulated FM signal, to produce a PAR-reduced version of each of the modulated OFDM symbols, while constraining their frequency-domain (symbol vector) distortion and out-of-band emissions to acceptable levels. After several iterations, process 300 converges to an acceptable compromise PAR while constraining the distortion to acceptable levels. As described below, process 300 involves various types of frequency-domain and time-domain signals/quantities, including an OFDM symbol vector (frequency-domain); a modulated OFDM symbol (time-domain); an FM segment vector (time-domain); an OFDM-demodulated FM segment (frequency-domain); a hybrid symbol (combined OFDM and FM) vector (frequency-domain); and a modulated hybrid symbol (time-domain).

Process 300 starts at block 172 with modulated OFDM symbols and a modulated FM signal. Two paths start in block 172, a left path for processing the modulated OFDM symbols and a right path for processing time segments (also referred to simply as "segments") of the modulated FM signal (i.e., referred to as "modulated FM segments") that correspond in time with the modulated OFDM symbols. For each modulated OFDM symbol processed by the left path, there is a corresponding modulated FM segment processed by the right path. In one example, the modulated OFDM symbols include vectors/blocks of 2160 time-domain complex samples per symbol at a sample rate of 744,187.5 Hz. Similarly, the modulated FM segments include vectors/blocks of 2160 time-domain complex samples per segment at the same sample rate. The algorithm processes one modulated OFDM symbol and corresponding modulated FM segment at a time. The next modulated OFDM symbol requires another execution of this algorithm, and so on.

The next modulated OFDM symbol is both the input and output of block 176. It simply shows that process 300 is processing the next modulated OFDM symbol. If the modulated OFDM symbol is not directly available in the time domain, then the modulated OFDM symbol can be derived from the frequency-domain OFDM symbol vector via IFFT with OFDM modulation. The OFDM symbol vector can be considered the frequency-domain representation for each FFT bin (subcarrier) prior to OFDM modulation, comprised of QPSK and/or QAM in-phase and quadrature values for the active subcarriers, as well as some "noise" values in the inactive subcarriers.

On the right path, block 178 receives the next modulated FM segment time-domain samples corresponding to the modulated OFDM symbol time-domain samples. Next, block 180 scales the modulated FM segment time-domain samples in amplitude to provide the proper ratio of analog and digital signals, to produce scaled modulated FM segment time-domain samples. Next, block 194 demodulates the scaled modulated FM segment time-domain samples (more generally the "scaled modulated FM segment") using the same demodulation as is applied to the modulated OFDM symbols, to produce a frequency-domain FM segment vector. That is, block 194 demodulates the modulated FM segment as if it were an OFDM symbol so that its effects can be processed in the frequency domain on the OFDM symbol vector on the right side. Block 194 provides the frequency-domain FM segment vector to block 196 on the left side to be processed with a hybrid symbol vector, described later.

Turning to the left path, block 182 combines (e.g., adds) the modulated OFDM symbol and modulated FM segment to form the modulated hybrid symbol.

Next, block 183 implements a current iteration counter to count/track a current number of iterations i (where i represents an iteration index) performed by process 300 on the modulated OFDM symbol currently being processed. Block 183 may reset the counter to zero each time a new modulated OFDM symbol is received at 176, and then increment the counter with each new iteration, to produce the current number of iterations i. Block 183 provides the current number of iterations i to a weight generator (WG)/block 186c, which derives individual weights for use in each of the iterations for PAR clipping based on i, as will be described in detail below.

Next, block 184 determines if the last iteration of process 300 is done, and either continues another iteration starting with block 186a, or outputs the modulated hybrid symbol on line 174 as a final PAR-reduced modulated OFDM symbol to be transmitted. The "DONE" condition can be determined simply when the current number of iterations i is one greater than a total number of iterations N to be performed (i.e., when i>N), although it is possible to use some other metric such as the actual PAR for this iteration. Compared to conventional PAR reduction algorithms, PAR reduction algorithm 300 advantageously reduces the number of iterations necessary to achieve a given level of PAR reduction. The total number of iterations N may be a predetermined number supplied to process 300, or may be set to a value upon receipt of each modulated OFDM symbol.

Next blocks 186a-186f collectively perform the clipping improvement according to embodiments presented herein. Block 186a clips magnitudes of the modulated hybrid symbol, to produce a clipped modulated hybrid symbol. Block 186a may employ a function that clips (limits) the magnitude of the complex time-domain OFDM symbol samples (of the modulated hybrid symbol) to a predetermined value. The phase of each sample is preserved. The peak-to-average power ratio reduction is accomplished through iterative peak clipping and other signal processing to repair the distortion effects and unwanted spectral emissions. The iterative repair process partially restores the peak, but the peak gradually diminishes with each iteration. An example clip level for an OFDM-based signal had been empirically established at 1.5 times (or 3.52 dB) the average envelope level voltage. This "optimum" level offers the best peak reduction over a span of iterations while the undesirable byproducts being repaired at each iteration meet the signal integrity and out-of-band emission requirements.

For convenience, the nominal root-mean-square (RMS) value of the input complex OFDM time-domain signal samples is scaled to one. The samples with magnitudes below 1.5 are unaffected; however, samples above 1.5 magnitude are set to 1.5 while preserving the phase of the input sample. Detecting samples above the clip level can be performed using the magnitude squared samples to minimize computations of the square root.

Although both soft and hard limiting functions can be used for clipping, the hard limiting function has shown to be simple and effective for this example. If the final PAR-reduced time-domain signal applied to the HPA is still expected to experience some compression at these reduced peaks, then a soft clipping or compression modeling the HPA should be included in this clipping process. By inclusion of this additional HPA compression, the PAR iterations will reduce the effects of this distortion.

The clip level for a hybrid signal depends upon the relative levels of the digital and analog components. Since the analog FM signal has a PAR of 1 (or 0 dB), the clip level of an analog-only signal would be one; thus, it would not need clipping. The clip level for a hybrid signal depends upon the relative levels of the digital and analog components. It is desirable to set this clip level based on an arbitrary analog-to-digital ratio.

The algorithm normalizes the digital portion of the signal to unity power (voltage squared), then adds the FM analog signal at the desired relative level. The analog signal is assumed to be a baseband complex exponential with unity power (magnitude=1), which is scaled by variable $scale_{fm}$ to achieve the desired analog-to-digital ratio. Intuitively, an expression to set the clip level should asymptotically approach 1.5 as the analog signal becomes very small compared to the digital component. Similarly, the clip level should asymptotically approach $scale_{fm}$ as the digital signal becomes very small compared to the analog.

A negative clip threshold is also established. Some hybrid signal HPAs have difficulty accommodating signals when the signal envelope approaches zero, or becomes small (negative dB). For this reason, a negative (dB) clipping level is also established. This level is dependent upon the actual HPA, and is not always needed. However, it was found that a negative clip level of −3 dB (or 0.707 magnitude) can be accommodated by the PAR Reduction algorithm without significant compromise on other performance parameters. So it may be prudent to set a default negative magnitude clip level of −3 dB (or 0.707 magnitude), which can be adjusted for any particular HPA requirement.

Next, block 186b obtains a clip value that represents a difference between the modulated hybrid symbol and the clipped modulated hybrid symbol. For example, block 186b subtracts the clipped modulated hybrid symbol from the modulated hybrid symbol, to produce a difference signal (DS). WG 186c receives the current number of iterations i and the total number of iterations N to be performed. WG 186c derives a weight (i.e., a weight value) as a function of/based on i and/or N, and provides the weight to block 186d. Block 186d scales/weights the difference signal by the weight produced by WG 186c (e.g., applies the weight to the difference signal), to produce a weighted difference signal (WDS). According to the embodiments presented herein, WG 186c varies or changes the weight across the iterations, and block 186d scales/weights the difference signal by the weight that varies across the iterations. The weight is varied in such a way as to improve the PAR reduction compared to when the weight is not varied, i.e., is constant.

In a multiplication example, block 186d multiplies the difference signal by the weight to produce the weighted difference signal. In a division example, block 186d divides the difference signal by the weight to produce the weighted difference signal. Block 186d may overweight the difference signal based on the weight, such that the weighted difference signal is greater than the difference signal. That is, the overweighting performed by block 186d based on the weight increases the difference signal. In the multiplication example, such overweighting may be achieved using a weight that is greater than one to increase the difference signal, while in the division example, the overweighting may be achieved using a weight that is less than one to increase the difference signal.

In the embodiments presented herein, blocks 186c and 186d cooperate to weight the difference signal (e.g., which represents a magnitude difference between the clipped modulated hybrid symbol and the modulated hybrid symbol) with a varying weight. As would be appreciated by one of ordinary skill in the relevant arts having read the present description, other arrangements may be used to weight the difference signal, provided such arrangements result in the weighted difference signal as described herein. Moreover, it is understood that weighting the difference signal is not limited to multiplying or dividing the difference signal by the weight; other weighting operations may be used, as long as the weighting operations produce the results described herein.

Because WG 186c derives the weight as a function of i and/or N in each iteration, the weight assumes different weight values in successive iterations. The ensuing description refers to the different "weight values" simply as different "weights" or "values." For example, different first, second, and third weights may be used in first (i=1), second (i=2), and third (i=3) iterations, respectively. The weights may vary as a function of i in many different ways. In the multiplication example, the weights may have values that (i) are each greater than one (i.e., weight w>1) to achieve overweighting, and (ii) decrease across the iterations, e.g., as i increases. In the division example, the weights may have values that (i) are each less than one (i.e., weight <1) to achieve overweighting, and (ii) increase across the iterations. The weights may vary stepwise (e.g., increase or decrease in steps) on a per-iteration basis. Also, the weights may increase (or decrease) with i for a first set of iterations, and then decrease (or increase) with i for a next set of iterations across the total number of iterations N.

The weights may vary as a function of N in different ways. In a first example, the values of weights used in corresponding iterations for different values of N may increase with N, as follows. Consider a first process using total N=N1 iterations and a second process using total N2 iterations, where N2>N1:

a. The first process for N=N1 uses weights $w(i)_{N1}$, where iteration index i (corresponding to the current number of iterations) progresses from i=1 (the first iteration) to i=N1 (the final iteration), i.e., the process uses weights $w(1)_{N1}$, $w(2)_{N1}$, and $w(3)_{N1}$ in respective first, second, and third iterations.

b. The second process for N=N2>N1 uses weights $w(i)_{N2}$, where iteration index i progresses from i=1 to i=N2, i.e., the process uses weights $w(1)_{N2}$, $w(2)_{N2}$, and $w(3)_{N2}$ in respective first, second, and third iterations.

In the first example, weights for corresponding iterations for different values of N increase as N increases, thus $w(i)_{N2} > w(i)_{N1}$. That is, $w(1)_{N2} > w(1)_{N1}$, $w(2)_{N2} > w(2)_{N1}$, $w(3)_{N2} > w(3)_{N1}$, and so on.

In a second example, weights for corresponding iterations for different values of N decrease as N increases, thus $w(i)_{N2} < w(i)_{N1}$. That is, $w(1)_{N2} < w(1)_{N1}$, $w(2)_{N2} < w(2)_{N1}$, $w(3)_{N2} < w(3)_{N1}$, and so on.

Figure 4:
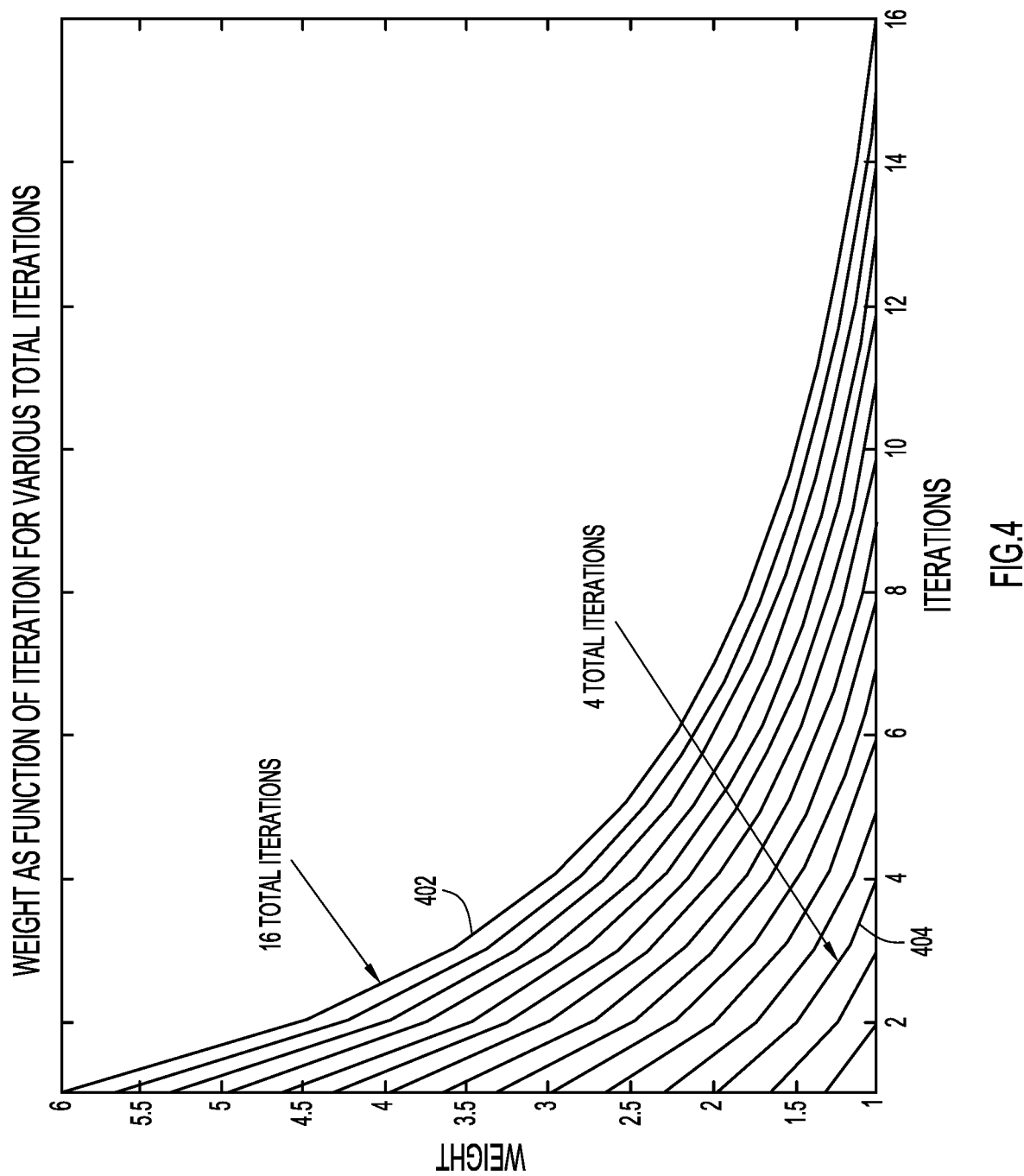
FIG. 4 shows example curves of weight vs. iteration number for various total numbers of iterations.

FIG. 4 is an illustration of how weights may vary as a function of both the total number of iterations N and iteration number i. More specifically, FIG. 4 shows separate example curves or plots of weight vs. iteration number ("iterations") for each of 15 different values of total number of iterations N. For example, a curve 402, for N=16, includes weights that decrease with each (successive) iteration. In another example, a curve 404, for N=4, includes weights that decrease with each (successive) iteration, and so on. While the weights decrease monotonically in each curve, the weights need not decrease monotonically. The initial weight used for the initial iteration (i=1) increases as N increases.

An example weighting function found empirically to be effective is given by:

$$\text{weight}(\text{totalIterations}, \text{iteration}) = (1 + (\text{totalIterations} * 0.5))/(1 + (\text{iteration} * 0.5)),$$

where totalIterations=N, and iteration=i.

Each weight may be computed in real-time in each iteration based on current values for i and N. Alternatively, the weights for the separate curves corresponding to each N may be stored in memory as predetermined values. Each curve may be indexed uniquely by its corresponding N ("totaliterations"), and each weight for that curve may be indexed uniquely by its corresponding iteration i. Thus, each weight of each curve may be retrieved from memory (i.e., is retrievable) using retrieval indices (i, N). In the examples above, the weights may vary as a function of i and N. In other examples, the weights may vary only as a function of i.

Although the example of FIG. 4 shows a different weight for each iteration (i), in some examples, the weight may remain constant for two or more iterations (i values) and then change, provided that the weight varies across a span of multiple iterations.

Returning to the processing on the left side of FIG. 3, block 186d provides the weighted difference signal to block 186e. Next, block 186e subtracts the weighted difference signal from the modulated OFDM symbol from block 176, to produce a weighted-clip (WC) or "modified" modulated OFDM symbol. The subtraction (block 186e) effectively clips only the digital portion (i.e., the modulated OFDM symbol) of the modulated hybrid symbol. Because the modulated OFDM symbol causes the increase in peak-to-average power, it makes sense to limit clipping to only the digital portion (i.e., the modulated OFDM symbol) of the modulated hybrid symbol. In summary, in blocks 186d and 186e, the difference signal between the modulated hybrid symbol and the clipped modulated hybrid symbol is weighted and then subtracted from the digital-only signal (i.e. the modulated OFDM symbol), to produce the modified modulated OFDM symbol. This provides a more efficient reduction of peak power without distorting the modulated FM signal. Use of the varying weights reduces the peak power samples in the modulated hybrid symbol with fewer iterations of the PAR algorithm, thus reducing computational complexity while increasing PAR reduction performance.

Next, block 186f combines (e.g., adds) the scaled modulated FM segment to the modified modulated OFDM symbol, to recreate the modulated hybrid symbol. Thus, block 186f produces a recreated modulated hybrid symbol.

Next, block 188 demodulates the recreated modulated hybrid symbol, to produce a frequency-domain hybrid symbol vector with a distorted digital modulation constellation, i.e., block 188 recovers the distorted digital modulation constellation. The distortion was introduced by the previous signal clipping process. The demodulation process used by block 188 is the reverse of the modulate OFDM symbol process described previously. The demodulation includes weighting (not to be confused with the weighting performed by block 186d) and folding of the ends (cyclic prefix) of the symbol time, then computing an FFT to yield a somewhat distorted version of the input symbol data vector.

If an optional frequency-domain equalization compensation was performed in a previous step, then this equalization must be temporarily removed for some of the next steps of the algorithm in this iteration. Assuming the frequency-domain equalization compensation was performed, in this iteration, block 190 temporarily removes the frequency-domain equalization compensation for some of the next steps of the algorithm. The vector used to remove the equalization is similar to the original equalization vector, but all the elements are reciprocals of the original equalization vector.

Next, block 192 removes the significant distortion of the distorted digital modulation constellation that was introduced by the previous signal clipping process. Block 192 produces a hybrid symbol vector having a constrained digital modulation constellation (e.g., a constrained QAM constellation). The intermodulation distortion caused by clipping introduces noise (distortion) into all the frequency bins of the symbol vector. Block 192 constrains the distortion components to acceptable levels. The distortion cannot be entirely eliminated since this would have the undesirable effect of restoring the peaks back into the time-domain signal. Instead, the distortion is modified in such a way as to minimize the degradation in QAM demodulation performance, and, at block 198, suppress out-of-band emissions to an acceptable level based upon a predefined out-of-band emissions mask vector. This process results in partial peak regrowth of the time-domain signal. Multiple iterations tend toward convergence to minimize the peaks while constraining the intermodulation products to acceptable levels.

The non-active subcarriers are also constrained to suppress out-of-band emissions within an acceptable predetermined mask level. An out-of-band emission mask is a vector of the same size as the OFDM symbol vector, where the inactive subcarriers are associated with a maximum mask magnitude defined for each inactive subcarrier. The inactive subcarriers for each OFDM symbol vector are constrained to not exceed the mask magnitude (or magnitude squared for computational efficiency) value. Each subcarrier (FFT bin) is unaffected when its value is below the mask. When a bin exceeds the mask, the magnitude is constrained to the mask level while preserving the phase of the bin.

Next, block 196 removes (i.e., subtracts) the OFDM-demodulated FM segment vector from block 194 from the hybrid symbol vector with the constrained digital modulation constellation, to produce an OFDM symbol vector. Note that, together, the previous addition (block 182) of the modulated FM segment to the modulated OFDM symbol and later subtraction (block 196) of the OFDM-demodulated FM segment vector also result in improvements in PAR reduction. First, the addition of the modulated FM segment allows the composite modulated hybrid symbol to be PAR-reduced (clipped). Subsequent OFDM demodulation in block 188 includes the interference effects of the modulated FM segment; however, these interference effects are eliminated in block 196. Therefore, the process eliminates analog-to-digital host interference caused by the FM signal bandwidth extending beyond ±100 kHz. Second, the OFDM-demodulated FM segment vector subtraction (block 196) allows subsequent suppression (block 198) of the intermodulation products due to the clipping. If the FM segment vector were not removed, then it would be impractical to process the intermodulation products that lie far beneath the FM signal spectrum. Therefore, this method also reduces the digital-to-FM interference, or intermodulation distortion to the FM signal due to clipping.

After the modulated OFDM symbol is demodulated (block 188) and its distorted digital modulation constellation constrained (block 192), block 198 applies a mask to the inactive subcarriers and, if the optional frequency-domain equalization compensation was performed in a previous step, then block 200 restores equalization.

Next, block 202 modulates and normalizes the OFDM symbol vector that has the constrained digital modulation constellation to produce a modified OFDM symbol (i.e., a PAR-reduced modulated OFDM symbol), which is used for the next iteration of the algorithm. Block 202 converts the OFDM symbol data vector into a time-domain signal for each OFDM symbol.

Additional details of many of the steps illustrated in FIG. 3 are described in U.S. Pat. Nos. 8,798,196 and 9,178,740, which are incorporated herein by reference.

Figure 5:
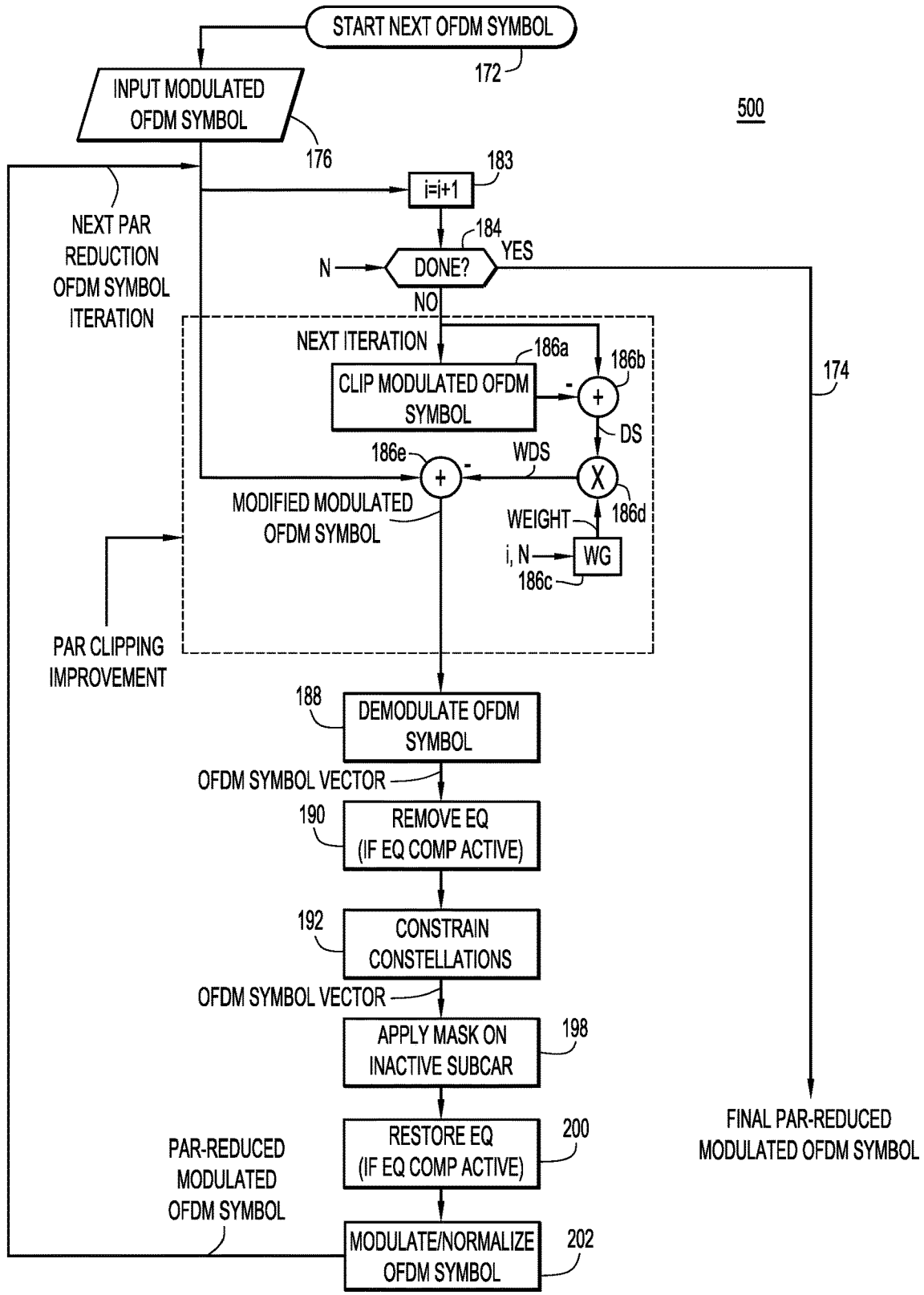
FIG. 5 is a flowchart of a second example PAR reduction algorithm iteration process for a modulated OFDM symbol.

FIG. 5 shows example operations for an iterative PAR reduction algorithm 500 (also referred to as "process 500") applied to modulated OFDM symbols alone, i.e., in the absence of the FM signal that was present in process 300. Process 500 represents a simplified version of process 300 that uses most, but not all, of the same blocks/operations that process 300 uses. Specifically, process 500 omits blocks 178, 180, 182, 186*f*, 194, and 196 associated with the FM signal, but retains the other blocks of process 300. The blocks of process 500 are substantially the same as their corresponding blocks in process 500, except they do not process contributions from the FM signal. Accordingly, the description of process 300 shall suffice for process 500, which will be described briefly.

Process 500 starts at block 172, with a new modulated OFDM symbol. Process 500 only includes operations retained from the left side of process 300. Block 183 increments the current number of iterations i, and block 184 performs the DONE test. If the DONE test passes, process 500 outputs the final PAR-reduced modulated OFDM symbol on line 174. If the DONE test fails, flow proceeds to blocks 186*a*-186*e*, which operate as described above, except that they process only the modulated OFDM symbol, not the modulated hybrid symbol.

More specifically, block 186*a* clips the modulated OFDM symbol, to produce a clipped modulated OFDM symbol. Block 186*b* obtains a difference signal between the modulated OFDM symbol and the clipped modulated OFDM symbol, e.g., subtracts the clipped modulated OFDM symbol from the modulated OFDM symbol. WG 186*c* generates a weight for the current iteration based on i and/or N. Block 186*d* weights the difference signal using the weight to produce a weighted difference signal. Block 186*e* subtracts the weighted difference signal from the modulated OFDM symbol to produce a modified modulated OFDM symbol. The weighting techniques and examples described above in connection with FIGS. 3 and 4 apply equally to the weighting used by process 500.

Block 188 demodulates the modified modulated OFDM symbol, to produce an OFDM symbol vector with a distorted digital modulated constellation that results from the former clipping. Block 190 removes an equalization component from the OFDM symbol vector if there is an equalization component to be removed. Block 192 constrains the distorted digital modulation constellation, to produce a constrained OFDM symbol vector. Block 198 applies a mask to the constrained OFDM symbol vector, and block 200 restores the equalization component if it was removed. Block 202 modulates and normalizes the OFDM symbol vector from block 200 to produce a PAR-reduced modulated OFDM symbol for the next iteration, which may be the final PAR-reduced modulated OFDM symbol after the final ($N^{th}$) iteration.

FIG. 6 shows Peak to Average Power Ratio (PAPR) performance comparison curves. A first PAPR curve 604 shows PAPR vs. iterations using the PAR clipping improvement, which weights the difference signal using weights that vary across the iterations. A second PAPR curve 606 shows PAPR vs. iterations for conventional PAPR, i.e., without the PAR clipping improvement. A comparison of curves 604 and 606 reveals a substantial improvement in PAPR (PAR reduction) performance when the PAR clipping improvement is used.

In summary, in one aspect, a method is provided method comprising: performing iterations of a peak-to-average ratio (PAR) reduction algorithm on a modulated orthogonal frequency division multiplexed (OFDM) symbol, each iteration including: clipping the modulated OFDM symbol to produce a clipped modulated OFDM symbol; subtracting the clipped modulated OFDM symbol from the modulated OFDM symbol to produce a difference signal; weighting the difference signal using a weight that varies across the iterations, to produce a weighted difference signal that varies across the iterations; subtracting the weighted difference signal from the modulated OFDM symbol to produce a modified modulated OFDM symbol; and performing further PAR reduction operations on the modified modulated OFDM symbol to produce a PAR-reduced OFDM symbol for use in a next iteration.

In another aspect, an apparatus is provided comprising: a modulator to produce a modulated orthogonal frequency division multiplexed (OFDM) symbol; a processor to perform iterations of a peak-to-average ratio (PAR) reduction algorithm on the modulated OFDM symbol to produce a final PAR-reduced modulated OFDM symbol, the processor configured to perform, for each of the iterations: clipping the modulated OFDM symbol to produce a clipped modulated OFDM symbol, and subtracting the clipped modulated OFDM symbol from the modulated OFDM symbol to produce a difference signal; weighting the difference signal using a weight that varies across the iterations, to produce a weighted difference signal that varies across the iterations; subtracting the weighted difference signal from the modulated OFDM symbol to produce a modified modulated OFDM symbol; and performing further PAR reduction operations on the modified modulated OFDM symbol to produce a PAR-reduced OFDM symbol for a next iteration; and an amplifier to transmit the final PAR-reduced modulated OFDM symbol.

In another aspect, a non-transitory computer readable medium encoded with instructions is provided. The instructions, when executed by a processor, cause the processor to perform iterations of a peak-to-average ratio (PAR) reduction algorithm on a modulated orthogonal frequency division multiplexed (OFDM) symbol, each iteration including: clipping the modulated OFDM symbol to produce a clipped modulated OFDM symbol; subtracting the clipped modulated OFDM symbol from the modulated OFDM symbol to produce a difference signal; weighting the difference signal using a weight that varies across the iterations, to produce a weighted difference signal that varies across the iterations; subtracting the weighted difference signal from the modulated OFDM symbol to produce a modified modulated OFDM symbol; and performing further PAR reduction operations on the modified modulated OFDM symbol to produce a PAR-reduced OFDM symbol for use in a next iteration.

In yet another aspect, a method is provided method comprising performing iterations of a peak-to-average ratio (PAR) reduction algorithm, each of the iterations including: combining a modulated orthogonal frequency division multiplexed (OFDM) symbol and a modulated frequency modulation (FM) segment to produce a modulated hybrid symbol; clipping the modulated hybrid symbol to produce a clipped modulated hybrid symbol; obtaining a difference signal between the modulated hybrid symbol and the clipped modulated hybrid symbol; weighting the difference signal using a weight that varies across the iterations, to produce a weighted difference signal that varies across the iterations; subtracting the weighted difference signal from the modulated OFDM symbol to produce a modified modulated OFDM symbol; and performing further PAR reduction operations on the modified modulated OFDM symbol and the modulated FM segment to produce a PAR-reduced OFDM symbol for use in a next iteration.

In another aspect, an apparatus is provided comprising: a modulator to produce a modulated orthogonal frequency division multiplexed (OFDM) symbol; an input to receive a modulated frequency modulation (FM) segment; a processor to perform iterations of a peak-to-average ratio (PAR) reduction algorithm on the modulated OFDM symbol and the modulated FM segment together to produce a final PAR-reduced modulated hybrid symbol, the processor configured to perform, for each of the iterations: combining the modulated OFDM symbol and the modulated FM segment to produce a modulated hybrid symbol; clipping the modulated hybrid symbol to produce a clipped modulated hybrid symbol; obtaining a difference signal between the modulated hybrid symbol and the clipped modulated hybrid symbol; weighting the difference signal using a weight that varies across the iterations, to produce a weighted difference signal that varies across the iterations; subtracting the weighted difference signal from the modulated OFDM symbol to produce a modified modulated OFDM symbol; and performing further PAR reduction operations on the modified modulated OFDM symbol and the modulated FM segment to produce a PAR-reduced OFDM symbol for use in a next iteration; and an amplifier to transmit the final PAR-reduced modulated hybrid symbol.

Although the techniques are illustrated and described herein as embodied in one or more specific examples, it is nevertheless not intended to be limited to the details shown, since various modifications and structural changes may be made within the scope and range of equivalents of the claims.

Each claim presented below represents a separate embodiment, and embodiments that combine different claims and/or different embodiments are within the scope of the disclosure and will be apparent to those of ordinary skill in the art after reviewing this disclosure.

What is claimed is:

1. A method comprising:

performing iterations of a peak-to-average ratio (PAR) reduction algorithm on a modulated orthogonal frequency division multiplexed (OFDM) symbol, each iteration including:

clipping the modulated OFDM symbol to produce a clipped modulated OFDM symbol;

subtracting the clipped modulated OFDM symbol from the modulated OFDM symbol to produce a difference signal;

weighting the difference signal using a weight that varies across the iterations, to produce a weighted difference signal that varies across the iterations, wherein the weight is determined using a function based on a current number of iterations "i" and a total number of iterations "N";

subtracting the weighted difference signal from the modulated OFDM symbol to produce a modified modulated OFDM symbol; and performing further PAR reduction operations on the modified modulated OFDM symbol to produce a PAR-reduced OFDM symbol for use in a next iteration.

2. The method of claim 1, wherein the weighting includes increasing the difference signal using the weight, such that the weighted difference signal is greater than the difference signal.

3. The method of claim 1, wherein the weighting includes multiplying the difference signal by the weight.

4. The method of claim 3, wherein the weight is greater than one and decreases across the iterations.

5. The method of claim 1, wherein the weighting includes dividing the difference signal by the weight.

6. The method of claim 5, wherein the weight is less than one and increases across the iterations.

7. The method of claim 1, wherein performing the iterations includes performing a total number of iterations, and the weight varies as a function of the total number of iterations and a current number of the iterations.

8. The method of claim 1, further comprising:
storing values of the weight to be used in the weighting such that the values of the weight are retrievable based on a retrieval index; and
retrieving the values of the weight using a current number of iterations performed by the PAR reduction algorithm as the retrieval index.

9. The method of claim 1, wherein performing the further PAR reduction operations includes:
demodulating the modified modulated OFDM symbol to recover an OFDM symbol vector with a distorted digital modulation constellation;
constraining the distorted digital modulation constellation, to produce an OFDM symbol vector with a constrained digital modulation constellation; and
modulating the OFDM symbol vector to produce the PAR-reduced OFDM symbol.

10. An apparatus comprising:
a modulator to produce a modulated orthogonal frequency division multiplexed (OFDM) symbol;
a processor to perform iterations of a peak-to-average ratio (PAR) reduction algorithm on the modulated OFDM symbol to produce a final PAR-reduced modulated OFDM symbol, the processor configured to perform, for each of the iterations:
clipping the modulated OFDM symbol to produce a clipped modulated OFDM symbol, and subtracting the clipped modulated OFDM symbol from the modulated OFDM symbol to produce a difference signal;
weighting the difference signal using a weight that varies across the iterations, to produce a weighted difference signal that varies across the iterations, wherein the weight is determined using a function based on a current number of iterations "i" and a total number of iterations "N";
subtracting the weighted difference signal from the modulated OFDM symbol to produce a modified modulated OFDM symbol; and
performing further PAR reduction operations on the modified modulated OFDM symbol to produce a PAR-reduced OFDM symbol for a next iteration; and
an amplifier to transmit the final PAR-reduced modulated OFDM symbol.

11. The apparatus of claim 10, wherein the processor is configured to perform the weighting by increasing the difference signal using the weight, such that the weighted difference signal is greater than the difference signal.

12. The apparatus of claim 10, wherein the processor is configured to perform the weighting by multiplying the difference signal by the weight.

13. The apparatus of claim 12, wherein the weight is greater than one and decreases across the iterations.

14. The apparatus of claim 10, wherein the processor is configured to perform the weighting by dividing the difference signal by the weight.

15. The apparatus of claim 14, wherein the weight is less than one and increases across the iterations.

16. A method comprising:
performing iterations of a peak-to-average ratio (PAR) reduction algorithm, each of the iterations including:
combining a modulated orthogonal frequency division multiplexed (OFDM) symbol and a modulated frequency modulation (FM) segment to produce a modulated hybrid symbol;
clipping the modulated hybrid symbol to produce a clipped modulated hybrid symbol;
obtaining a difference signal between the modulated hybrid symbol and the clipped modulated hybrid symbol;
weighting the difference signal using a weight that varies across the iterations, to produce a weighted difference signal that varies across the iterations, wherein the weight is determined using a function based on a current number of iterations "i" and a total number of iterations "N";
subtracting the weighted difference signal from the modulated OFDM symbol to produce a modified modulated OFDM symbol; and
performing further PAR reduction operations on the modified modulated OFDM symbol and the modulated FM segment to produce a PAR-reduced OFDM symbol for use in a next iteration.

17. The method of claim 16, wherein the weighting includes increasing the difference signal using the weight, such that the weighted difference signal is greater than the difference signal.

18. The method of claim 16, wherein the weighting includes multiplying the difference signal by the weight.

19. The method of claim 18, wherein the weight is greater than one and decreases across the iterations.

20. The method of claim 16, wherein the weighting includes dividing the difference signal by the weight.

21. The method of claim 20, wherein the weight is less than one and increases across the iterations.

22. The method of claim 16, wherein performing the iterations includes performing a total number of iterations, and the weight varies as a function of the total number of iterations and a current number of the iterations.

23. The method of claim 16, wherein performing the further PAR reduction operations includes:
combining a version of the modulated FM segment with the modified modulated OFDM symbol, to produce a recreated modulated hybrid symbol;
demodulating the recreated modulated hybrid symbol to produce a hybrid symbol vector, and demodulating the modulated FM segment to produce an FM segment vector;
constraining a digital modulation constellation of the hybrid symbol vector to produce a hybrid symbol vector with a constrained digital modulation constellation;
subtracting the FM segment vector from the hybrid symbol vector with the constrained digital modulation constellation, to produce an OFDM symbol vector; and modulating the OFDM symbol vector to produce the PAR-reduced OFDM symbol.

* * * * *